United States Patent
Ronen

[19]

[11] Patent Number: 5,845,267
[45] Date of Patent: Dec. 1, 1998

[54] SYSTEM AND METHOD FOR BILLING FOR TRANSACTIONS CONDUCTED OVER THE INTERNET FROM WITHIN AN INTRANET

[75] Inventor: Yzhak Ronen, West Windsor, N.J.

[73] Assignee: AT&T Corp, Middletown, N.J.

[21] Appl. No.: 709,248

[22] Filed: Sep. 6, 1996

[51] Int. Cl.⁶ .................................................. H04M 15/00
[52] U.S. Cl. ................ 705/40; 705/29; 705/25; 379/114; 380/23; 395/200.15; 395/200.76
[58] Field of Search .............................. 379/114; 380/23; 395/200.76, 200.15; 705/40, 25, 29

[56] References Cited

U.S. PATENT DOCUMENTS

| | | | |
|---|---|---|---|
| 5,590,181 | 12/1996 | Hogan et al. | 379/114 |
| 5,608,874 | 3/1997 | Ogawa et al. | 395/200.15 |
| 5,671,279 | 9/1997 | Elgamal | 380/23 |
| 5,727,159 | 3/1998 | Kikinis | 395/200.76 |

*Primary Examiner*—Allen R. MacDonald
*Assistant Examiner*—M. Irshadullah
*Attorney, Agent, or Firm*—Stephen M. Gurey

[57] ABSTRACT

A system and method is disclosed for performing centralized billing for transactions conducted by a user on a terminal (101) connected on an Intranet (103) with an Internet Service Provider (ISP) (115) connected to the Internet (104). A Firewall Gateway (105) interconnects the Intranet and the Internet and removes the terminal's IP address from packets transmitted by the user's terminal to the ISP on the Internet. A Session Manager (116) stores in a database (117) the associations between the IP address of the user's terminal and the user's identity, and between the IP address and the Connection ID of the connection established between the Firewall Gateway and the ISP for an ongoing transaction between the user and the ISP. A Billing Platform (120) receives a signal indicating the cost of the transaction and the Connection ID associated with the transaction from the ISP. The Billing Platform then accesses the database (117) of the Session Manager to determine the identity of the user from the Connection ID and an account of the identified user is retrieved in a database (127) associated with the Billing Platform. The account is then billed for the cost of the transaction and forwarded to a billing entity (130-1–130-5) for billing to the user in accordance with the user's pre-established billing mechanism.

16 Claims, 3 Drawing Sheets

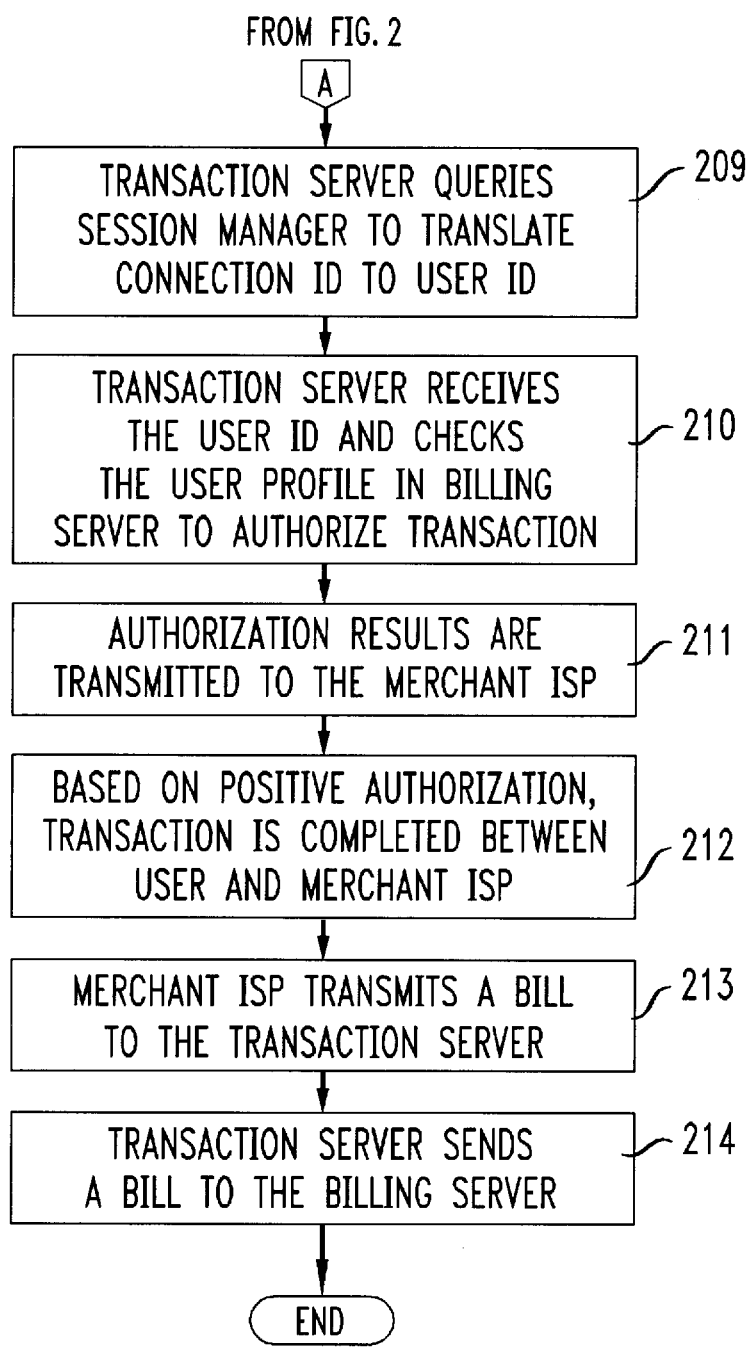

SYSTEM AND METHOD FOR BILLING FOR TRANSACTIONS CONDUCTED OVER THE INTERNET FROM WITHIN AN INTRANET

TECHNICAL FIELD

This invention relates to a system and method of billing for information, interactive services, software, or tangible or intangible goods transacted for or provided over the Internet.

BACKGROUND OF THE INVENTION

The Internet today has become the gateway for connected users to access a plethora of information and interactive services. In addition, the Internet can provide users a mechanism for ordering various goods and services, including theater/concert tickets and merchandise, that will later be delivered by conventional transport means, and for ordering and receiving non-tangible goods that can be delivered in digital format directly over the Internet coincident with the transaction. Example of the latter may include software, music, video, and even electronic cash.

Billing for information and/or interactive services provided over the Internet, and for services or tangible or intangible goods ordered over the Internet and provided conventionally, or intangible goods delivered over the Internet, which are provided from a plurality of different sources, requires the user to establish a financial relationship with each of the many different merchant Internet Service Providers (ISPs). In many instances, the relationship may be very fleeting if the user only wants to access information or an interactive service or order merchandise from an ISP once or twice, or only on a very occasional basis. Establishing such a relationship with a multitude of different merchant ISPs is inconvenient and will generally require furnishing the ISP with some type of payment mechanism, such as supplying a credit card number, in order for the information, service, and/or goods to be provided via the Internet or other transport mechanism. In view of the non-secure nature of the Internet, users generally do not wish to provide their credit card number to an ISP unless it can be done in a secure fashion.

In co-pending patent application, Ser. No. 08/636,109, filed Apr. 22, 1996, which is incorporated herein by reference, a method for billing a user for transactions conducted over the Internet is disclosed. As disclosed therein, transactions are billed to a user by associating a user's identity with the IP address of the user's terminal that has been assigned to that terminal generally by an Internet Access Provider for a user's session on the Internet. A billing platform, connected on the Internet, is then provided with the relationship between the user's identity and the IP address assigned to the user's terminal for the session. In response to a message from the merchant ISP that includes the IP address of the terminal conducting the transaction and the cost of the transaction, the billing platform adds the charges for the transaction to an account associated with the user. Such charges are then paid in accordance with a billing mechanism previously established between the user and the billing platform, such as to the user's bank credit card, debit account, merchant credit card, or telephone account.

When the user's terminal is connected within an Intranet, i.e., a local private data network managed by a corporation or other business or educational organization, all data packets passed between the Intranet and the Internet are first passed through a Firewall Gateway that controls the flow of information between the public Internet and the local private Intranet. Such a Firewall Gateway removes the user's IP address from each packet and instead conveys its own IP address as the source of each packet transmitted onto the public Internet. The Firewall Gateway directs the packets in the return message from the Internet to the proper terminal on the Intranet using a globally unambiguous connection identifier (Connection ID) within each packet to associate each packet to the proper IP address. Such Connection ID includes the following four parameters: the IP address of the ISP to which connection is made and the port number at that ISP for that connection, and the IP address of the Firewall Gateway and the port number at the Firewall Gateway for that connection.

To the world on the Internet outside the Intranet, the IP address of the Firewall Gateway rather than the IP address of the user's terminal appears as the source address from which all packets from these user's terminals on the Intranet originate and the destination address to which packets from merchant ISPs on the Internet to these terminals are directed. The IP address recognized by a merchant ISP in a request from a user's terminal on an Intranet therefore cannot be directly and automatically associated with a user's identity for billing purposes as is done in accordance with the aforenoted co-pending patent application.

SUMMARY OF THE INVENTION

In accordance with the present invention, billing for transactions conducted by a user through a terminal connected on a private Intranet with an ISP on the Internet is effected by using a the Connection ID to identify the particular connection established between the Firewall Gateway and the particular merchant ISP, which is providing over Intranet and Internet connections the information or services requested by the user, or is the receptor of the user's order for tangible or intangible goods. The relationship between this Connection ID and the IP address is transmitted to and received and stored by a Session Manager connected within the private Intranet network. This same Session Manager also receives and stores the relationship between the user's terminal IP address and the user's identity, which is provided to the Session Manager when the user initiates a connection on the Intranet. When the user attempts to conduct a transaction with a merchant ISP on the public Internet, a Billing Platform is queried by the merchant ISP before the transaction is effected. The Billing Platform, in turn, using the Connection ID associated with the particular connection over which the request for service, information, etc. is being made, queries the Session Manager. The Session Manger thereupon translates that Connection ID to a corresponding IP address which, in turn, is translated into a user's ID from which the user's account is accessed at the Billing Platform. Once that user's account is accessed, authorization to proceed with the transaction is transmitted to the merchant ISP, which then completes the transaction with the requesting user. At the conclusion of the transaction, the billing information is provided from the merchant ISP back to the Billing Platform, which bills the user's account in accordance with a predetermined billing mechanism previously established by the user and determined by the Billing Platform in accordance with one or more parameters associated with the transaction. These parameters can include the amount of the transaction, the type of transaction, and/or the identity of the merchant ISP. Accordingly, the user's bank credit card, the user's debit card, the user's telephone account, the user's merchant credit card associated with the merchant ISP, or any other preselected billing mechanism is used to bill the user for the cost of the transaction.

In the disclosed embodiment of the present invention, the Billing Platform includes both a Transaction Server and a Billing Server. The Transaction Server interacts with the merchant ISP that is providing information and/or services to the user and records the charges associated with all those transactions associated with a particular IP address-Connection ID relationship. At the conclusion of all such transactions conducted over that same Connection ID, the Transaction Server sends all transaction information for the associated user to the Billing Server, which then bills the user's various accounts in accordance with the previously established billing mechanism.

BRIEF DESCRIPTION OF THE DRAWINGS

FIGS. 2 and 3 together show a flow chart that illustrates steps for effecting billing to an account associated with such a user on an Intranet for a transaction conducted by the user on the Internet.

DETAILED DESCRIPTION

Figure 1:
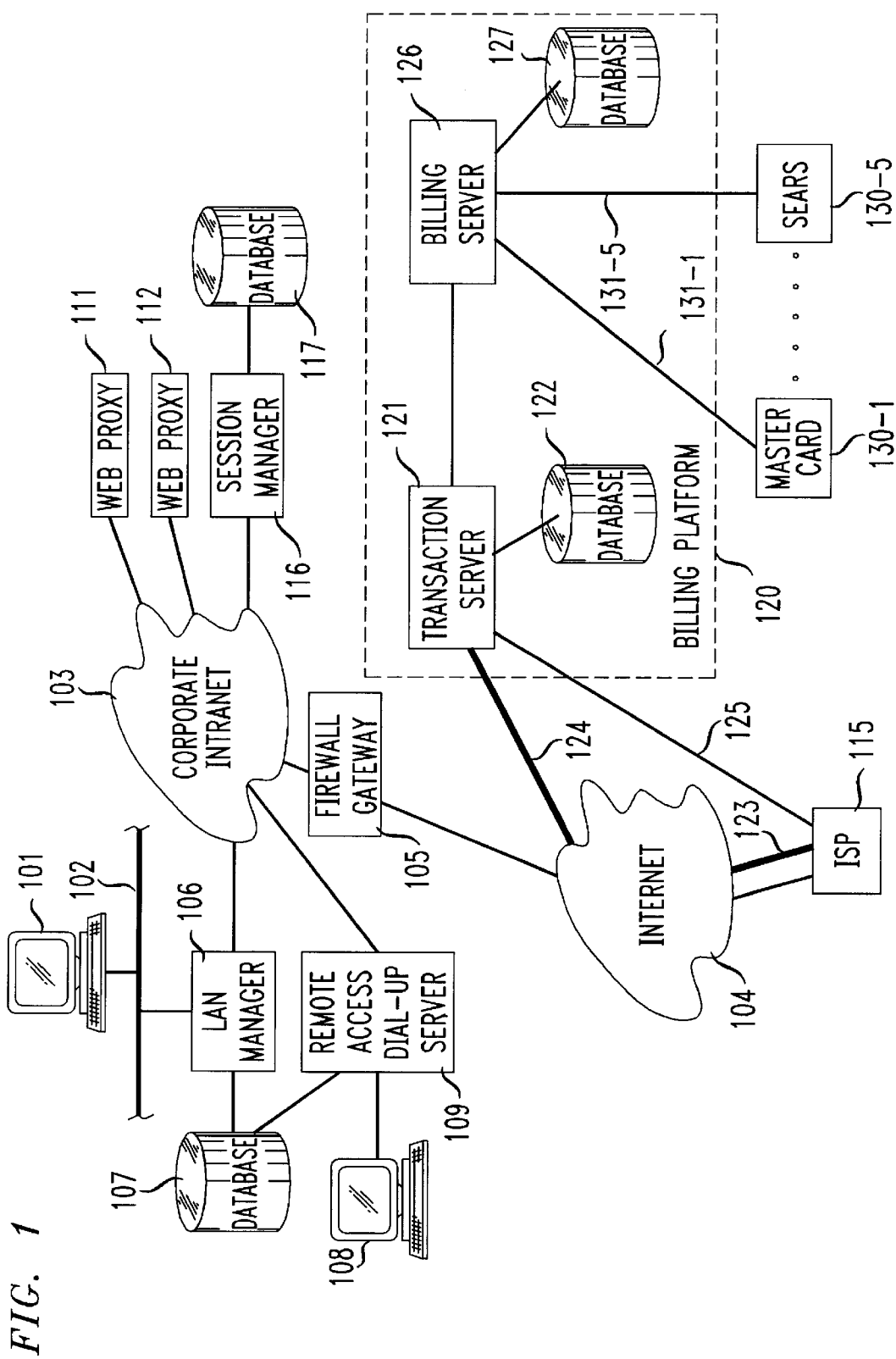
FIG. 1 is a block diagram showing the network elements for providing the centralized billing functionality of the present invention for transactions conducted by a user located within an Intranet that is connected to the Internet through a Firewall Gateway.

With reference to FIG. 1 a user's terminal 101 is connected to a Local Area Network (LAN) 102 over which packets of data are transmitted to other terminals on the same LAN, or to terminals on other LANS through a localized corporation's or educational institute's Intranet 103. Such packets may also be transmitted through the Intranet 103 to the public Internet 104 through a Firewall Gateway 105. As will be described, Firewall Gateway 105 acts as an agent for all transactions conducted by all the terminals connected on Intranet 103 to Internet Service Providers (ISPs) on the outside world connected on the Internet 104, such as ISP 115. Such ISPs provide information and/or interactive services, or may be the interface through which software, music or electronic cash can be downloaded to the user, tickets ordered, or other merchandise ordered that upon completion of the on-line transaction is later delivered by mail or other means.

A LAN Manager 106, connected to LAN 102, routes those packets originating from or destined to terminal 101 to and from other terminals connected to Intranet 103 or Internet 104, or to and from an ISP connected on the Internet 104, such as ISP 115. The LAN Manager 106 assigns an ID to terminal 101 when the user first connects the terminal to LAN 102. This ID is an IP (Internet Protocol) address, which may be assigned dynamically each time terminal 101 is turned on for connection to the network, or may be assigned a static value that remains associated with that terminal as long as that terminal remains physically connected to LAN 102. Data base 107 serves to store the static or dynamically assigned IP addresses of all such connected terminals, the IDs of the users associated with the IP addresses, and the passwords associated with the user IDs that must be used in order for a user to gain access through Manager 106 to the Intranet 103.

A user at a terminal 108 located off the corporate or educational facility premises can also be connected to the Intranet 103 through the switched telephone network (not shown) using a dial-up modem (not shown) that is internal or external to terminal 108, to access a Remote Access Dial-up Server 109. Server 109 assigns an IP address to terminal 108 and routes packets through Intranet 103 to and from destinations on the Intranet 103 or Internet 104 in accordance with the destination address in each packet. Server 109 is also connected to database 107, which stores as detailed above, the relationship between the IP address assigned to terminal 108 and the user identity.

In order to access the Internet 104 from within the Intranet 103 environment, all packet traffic first flows through a Web Proxy connected to the Intranet, such as Web Proxy 111. Only those packets passing through designated web proxies are accepted by Firewall Gateway 105 for transmission outside the Intranet. A browser menu within the Internet navigation software installed on each user's terminal, such as terminal 101, thus specifies the particular web proxy on Intranet 103 to which packets to and from that terminal need flow if such packets are intended for transmission onto or off of the Internet 104, respectively. The web proxy in turn forwards all outgoing packets to the Firewall Gateway 105, for transmission onto the Internet 104. Before being forwarded to the Gateway 105, however, a web proxy may point to another web proxy, such as 112, which forwards all Internet-destined packets to the Firewall Gateway 105.

As noted, Firewall Gateway 105 acts as the agent for all terminals connected through the Intranet to the Internet. It functions to terminate the connection with the user's terminal 101, open a new connection with an ISP, such as ISP 115, with which the user intends to communicate, and passes information between processes while monitoring those packets passing there through according to pre-formulated gateway rules. Thus, Firewall Gateway 105 may function to prevent users on Intranet 103 from gaining access to certain sites by screening the destination IP addresses of outgoing packets. The gateway may also screen incoming traffic to prevent certain types information from reaching the users connected to the Intranet. Corporations typically use firewalls to prevent outsiders on the Internet from accessing information on internal server sites, and to prevent employees from accessing certain sites, such as ISPs that provide sexually-oriented material.

When Firewall Gateway 105 creates a process with any ISP, the connection is identified by the Connection ID, which consists of the IP address of the source, a port number of the source, the IP address of the destination, and the port number of the destination, which Connection ID is incorporated in each packet transmitted to the ISP. When ISP 115 receives a packet initiating a process, it responds back to the IP address of Firewall Gateway 105 on the same connection. The Firewall Gateway 105, from the Connection ID contained within each packet, associates the responsive packets with the IP address of the user's terminal and forwards the responsive packets back to user terminal 101. At the end of a process between a user and an ISP, the Connection ID associated with that process is released and made available for use by another user's terminal. ISP 115 therefore is unable to directly associate the process with either a user's ID, or with the user's terminal IP address since the only IP address presented to it is the IP address of the Firewall Gateway 105 contained within the Connection ID. Furthermore, Firewall Gateway 105 does not in fact "know" the identity of the user with whom it is communicating, but only the user's terminal IP address, which may have been assigned to the terminal for use only during a current session.

In accordance with the invention, a Session Manager 116 and associated database 117 are connected to the Intranet 103. Session Manager 116 collects from all the LAN Managers connected to Intranet 103 for each user currently on the system, the relationship between the IP address assigned to the user's terminal and the user's ID. Further, Session Manager 116 receives from Firewall Gateway 105 the relationship between the IP address and the associated Connection ID for all ongoing processes through the Firewall. Session Manager 116 is thus continually collecting and storing in database 117 the current relationships between Connection IDs and IP addresses, and between IP addresses and user IDs. Session Manager therefore is able to directly translate the Connection ID for an ongoing process into the identity of the user initiating the process.

As one user terminates a process with an ISP, another user on Intranet 103 with a different IP address may access that same ISP. The Connection ID associated with the process with the second user may thus be identical to the Connection ID associated with the first user. Thus, as the new relationship between the Connection ID and the user IP address is conveyed to the Session Manager 116, the previous association between the first user's ID and the same Connection ID is automatically canceled.

When the user at terminal 101 is connected through Firewall Gateway 105 to a merchant ISP 115 for purposes of obtaining information and/or services, or conducting any type of transaction for which a cost is associated, such as the purchase of tangible or intangible goods, the ISP before delivering the information, services or goods, or authorizing the delivery of such information, services or goods, obtains credit approval from the Billing Platform 120 connected to Internet 104. Although illustrated in this embodiment as being connected on the Internet 104, the Billing Platform could be connected on the Intranet 103, or any other Intranet. In such a case, the Firewall Gateway associated with the Intranet would need to be arranged to permit access to the Billing Platform from merchant ISPs located on the Internet. A Transaction Server 121 and its associated database 122 within Billing Platform 120 are thus contacted by ISP 115 via secured Internet connections 123 and 124 or via a direct private link 125. Such secured links are noted in FIG. 1 as having thicker lead lines. The Transaction Server 121 is provided with the Connection ID that identifies the IP address and port number assigned for the present instance of communication by the merchant ISP 115 and the IP address and port number assigned for this present instance of communication by Firewall Gateway 105. In addition, Transaction Server 121 is provided with information related to the transaction, such as the cost and type of transaction involved. Transaction server 121 then queries Session Manager 116 over the Internet and Intranet to translate that Connection ID to the corresponding user ID. Transaction Server 121, once having received the identity of the user, contacts the Billing Server 126 to determine whether that user is an authorized user to whom transactions can be authorized and billed. Billing Server 126 thus checks its database 127 to ascertain whether a billing mechanism has previously been established for that user.

A billing mechanism may have previously been established by the user with the Billing Platform 120 through interactions between the user and the Transaction Server 121, which acts as a broker for the Billing Server 126. Such a billing mechanism is established by a user desiring a centralized billing functionality for Internet transactions. In establishing such a billing mechanism, the user provides his or her selected choices for how charges for transactions on the Internet are to be billed. These choices may include a specific credit card, an account associated with a telephone number, or a debit account to be billed. In addition, the user may specify that certain transactions, depending upon the type of transaction, be billed in a specific manner. Thus, the user may want all transactions involving purchases from a specified retailer to be billed to that retailer's own credit card, and other purchases to be billed to a bank credit card, such as MasterCard or VISA. Charges for transactions of a certain type for less than a predetermined amount may be designated for billing to an identified telephone account associated with the user. Charges for transactions for greater than some other predetermined amount may be designated for billing to an identified debit account.

After the user interacts with Transaction Server 121 to establish a desired billing mechanism, Transaction Server 121 passes the information to Billing Server 126 for storage on database 127. Billing Server 126 thus has stored on database 127 for each user who is currently engaged in a transaction and who has arranged for such centralized billing functionality, a record that includes the parameters of billing and the billing choice. Table 1 shows an example of such a record.

TABLE 1

| User ID | Parameters | Billing Choice |
|---|---|---|
| John Smith smith. 1234 | tangible goods ≦ $40.00 | Chase Debit Account 987-654-321 |
| | tangible goods > $40.00 | MasterCard Account 123-456-7890 |
| | information services | Telephone Account 201-555-1234 |
| | all purchases from Sears | Sears Account 444-333-777 |
| | software | VISA Account 999-222-666 |

The Billing Server 126 also stores in database 127 for each user a record that includes information for each transaction charged to that user's account. Table 2 shows an example of the type of transaction-oriented information stored in database 127 for each transaction associated with an identified user.

TABLE 2

User ID - smith. 1234
date of transaction - 041596
ISP accessed - Dow Jones
Service used - stock report
account billed - telephone number 201-555-1234
charge - $.50
date of transaction - 041696
ISP accessed - Microsoft
Service used - download software
account billed - VISA Account 999-222-666
charge - $25.00

Assuming that the user at terminal 101 has established a billing mechanism that is resident on database 127 of Billing Server 126, and is authorized to charge for further transactions, then Billing Server 126 signals Transaction Server 121, which in turn opens a record in database 122 to record all transactions associated with that user on the Connection ID of the present instance of communication between the user 101 and the merchant ISP 115. Thus, once the Billing Server 126 affirms the user at terminal 101 as an authorized user who has pre-established a billing mechanism, Transaction Server 121 is signaled and, in turn, a message is sent to merchant ISP 115 authorizing the transaction. At the conclusion of each transaction with ISP 115, such as the provision of information and/or services, the delivery of intangible goods over the Internet, or the purchase of intangible or tangible goods for later delivery, ISP 115 sends a message back to Transaction Server 121 indicating the cost associated with the transaction and the details of the transaction. Transaction Server 121 therefore maintains a record in its database 122 for each transaction conducted by the user with ISP 115.

During a session the user at terminal 101 may in fact conduct many chargeable transactions with a plurality of different ISPs, each being conducted over connections identified by different Connection IDs. For each such transaction, Session Manager 116 provides the association between the present Connection ID and the user ID to Transaction Server 121, which associates the charges for each transaction with the that same user at terminal 101. Database 122 therefore accumulates and aggregates the transactions associated with a plurality of different users. In some periodic manner, such as once each hour or once a day, or some fraction or multiple of either, Transaction Server 121 provides to Billing Server 126 all the accumulated billing information for those users who have engaged in chargeable transactions within that interval. Such billing information includes the charges and associated transaction information required by Billing Server 126 to properly bill each user in accordance with that user's pre-established billing mechanism. Billing Server 126 thereby associates each transaction for billing in accordance with the associated user's the billing mechanism, such as that illustrated in Table 1 above. Each of the user's transactions is then recorded and stored in database 127, as shown in Table 2, above. The appropriate accounts in the various billing entities, 130-1–130-5, of VISA, MasterCard, etc., are then charged accordingly by means of messages transmitted over private facilities 131-1–131-5, or other transmission facilities, between the Billing Server 126 and these entities.

The functions performed within the Billing Platform 120, as described above, could be distributed between the Transaction Server 121 and Billing Server 126, or other servers, in a manner different than described above. Also, although described in conjunction with a separate Transaction Server 121 and Billing Server 126 that each have associated databases, the present invention could be implemented with a single server and associated database in which each transaction is billed to a user's account in accordance with the user's billing mechanism.

Figure 2:
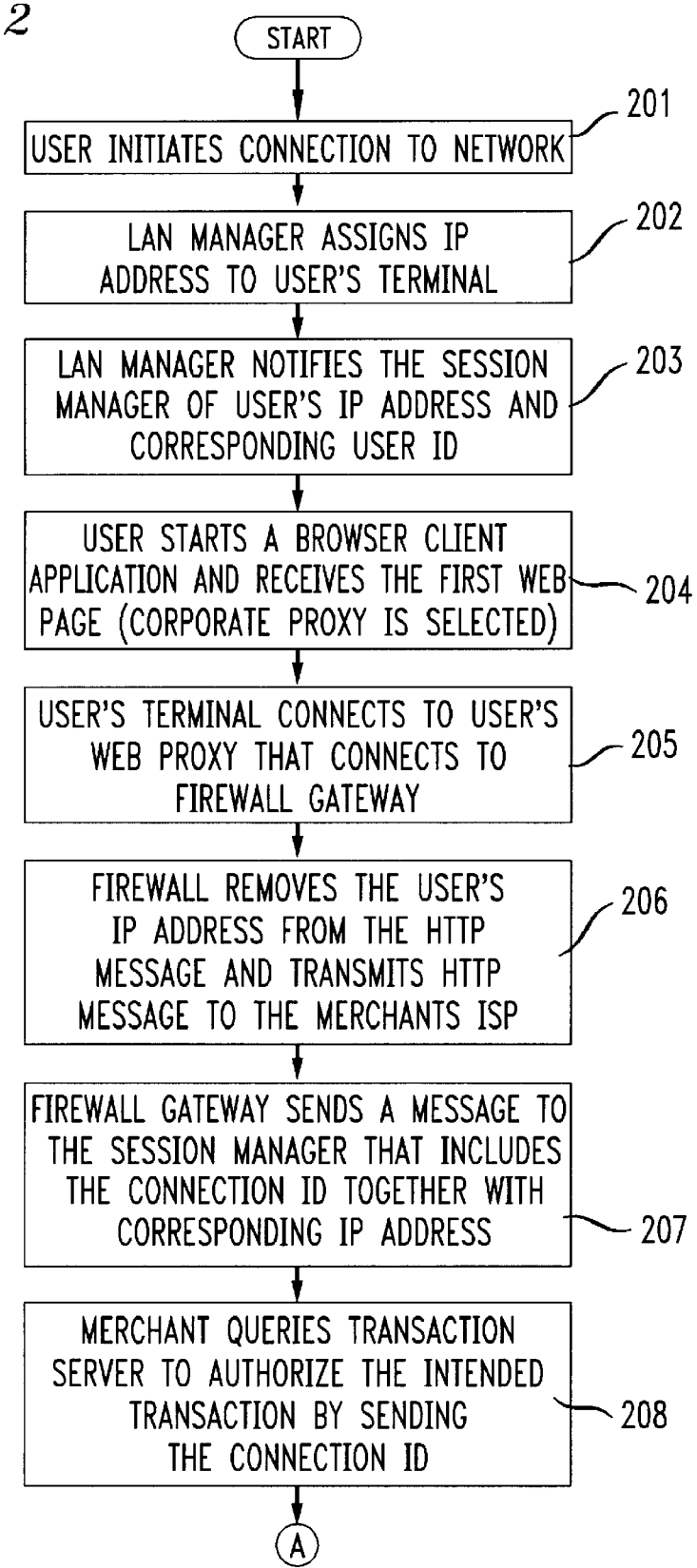

The steps of the present invention are illustrated in FIGS. 2 and 3. At step 201, the user initiates a connection to the network. At step 202, the LAN Manager assigns an IP address to the user's terminal. The LAN Manager then notifies the Session Manager of the IP address assigned to the user's terminal and the associated user ID, at step 203. At step 204, the user starts a browser client application and receives the first web page. A corporate web proxy is selected in accordance with a configuration set-up by the user in the application. At step 205, the user's terminal is connected to the web proxy, that in turn is connected to the corporate Firewall Gateway. At step 206, the Firewall Gateway removes the user's IP address from the HTTP message destined to a merchant ISP and transmits the HTTP message to that ISP. The Firewall Gateway then sends, at step 207, a message to the Session Manager that includes the Connection ID of the connection between the Firewall Gateway and the merchant ISP together with the corresponding IP address of the user's terminal. This Connection ID includes the IP address of the Firewall Gateway and the port at the Firewall Gateway, and the IP address of the merchant ISP and the port at the merchant ISP. At step 208, the merchant ISP queries the Transaction Server to authorize the intended transaction by forwarding the Connection ID over which the request for the transaction is being made. At step 209, the Transaction Server queries the Session Manager to translate the Connection ID provided to it by the Transaction Server with a user ID. At step 210, the Transaction Server receives a response from the Session Manager that associates the Connection ID with a user ID and the Transaction Server checks the Billing Server to determine whether that user has established a billing mechanism, and that that user has not exceeded any credit limits that might have been imposed with that user's account. It the user is authorized to proceed with the transaction by the Billing Manager, that information is forwarded to the Transaction Manager and, at step 211, authorization to proceed with the transaction is forwarded to the merchant ISP. At step 212, in response to an authorization from the Transaction Server, the merchant ISP provides the requested information and/or services, or enters the order placed by the user. At step 213, the merchant ISP forwards a bill to the Transaction Server indicating the cost of the transaction, the type of transaction, and the Connection ID associated with the transaction. The Transaction Server receives the information for that transaction for that Connection ID, associates it with a user ID, and combines it with information for other transactions associated with that user ID. At step 214, at some time thereafter, the Transaction Server forwards all the transactions associated with that user ID to the Billing Server, which bills those possibly different accounts associated with the user in accordance with the billing mechanisms pre-established by the user for each type of transaction.

Although described hereinabove in connection with the billing for transactions conducted between a terminal located on an Intranet and an ISP located on the Internet, the present invention could be applied to the billing for transactions conducted over any type of network in which the connection to the provider is not associated with an address that identifies the user's terminal, but which is associated with only by some type of connection identifier that uniquely identifies the connection to the provider. In such an application the relationship between the connection identifier and the address are stored together with the relationship between the terminal address and the identity of the user using the terminal. These stored relationships are retrieved to determine the identity of the user in response to a received billing signal that associates the cost for a transaction with the connection identifier. That user's account is then billed for the cost of the transaction.

The above-described embodiments are illustrative of the principles of the present invention. Other embodiments could be devised by those skilled in the art without departing from the spirit and scope of the present invention.

The invention claimed is:

1. A method of billing an account associated with a user's identity for a cost of a transaction conducted between a user through a terminal connected to an Intranet with a merchant which provides goods and/or services through an Internet Service Provider (ISP) which is connected on the Internet, the terminal being assigned an Internet Protocol (IP) address that is included in packets transmitted by the terminal, the IP address being removed by a Firewall Gateway that interconnects the Intranet and the Internet from packets transmitted from the terminal onto a connection on the Internet established between the Firewall Gateway to the provider, the connection being identifiable by a Connection ID that unambiguously identifies the connection, the connection ID comprising IP addresses and port numbers associated with each end of the connection, the method comprising the steps of:

receiving a signal that associates the user's identity with the IP address assigned to the terminal;

receiving a signal that associates the Connection ID with the assigned IP address;

storing the associations between the assigned IP address and the user's identity and between the Connection ID and the assigned IP address;

receiving a billing signal that associates the cost of the transaction identifier with the Connection ID;

using the connection ID associated with the billing signal, determining the user's identity from the stored associations between the Connection ID and the assigned IP address, and between the assigned IP address and the user's identity;

billing the account associated with the user's identity for the cost of the transaction.

2. The method of claim 1 wherein the transaction involves providing the user with an interactive service.

3. The method of claim 1 wherein the transaction involves ordering and receiving an intangible good in digital format by the user's terminal from the ISP on the Internet.

4. The method of claim 3 wherein the intangible good is software.

5. The method of claim 1 further comprising the step of transmitting the cost of the transaction billed to the account associated with the user's identity to a billing entity for billing to the user in accordance with a billing mechanism established by the user.

6. The method of claim 5 wherein the billing entity is determined by the billing mechanism in accordance with the cost of the transaction.

7. The method of claim 5 wherein the billing entity is determined by the billing mechanism in accordance with the type of transaction.

8. The method of claim 5 wherein the billing entity is determined by the billing mechanism in accordance with the identity of the ISP.

9. The method of claim 5 wherein the billing entity is determined as a function of the cost of the transaction, the type of transaction, and the identity of the ISP.

10. The method of claim 1 wherein after the step of determining the user's identity, the method further comprises the steps of:

determining whether an account has been established by the user for billing for transactions conducted on the network; and authorizing the transaction with the provider if an account has been established.

11. A system for billing an account associated with a user's identity for a cost of a transaction conducted between a user at a terminal connected to an Intranet with a merchant which provides goods and/or services through an Internet Service Provider (ISP) which is connected on the Internet, the terminal being assigned an Internet Protocol (IP) address that is included in packets transmitted by the terminal, the IP address being removed by a Firewall Gateway that interconnects the Intranet and the Internet from packets transmitted from the terminal onto a connection on the Internet established between the Firewall Gateway to the provider, the connection being identifiable by a Connection ID that unambiguously identifies the connection, the connection ID comprising IP addresses and port numbers associated with each end of the connection, the system comprising:

a manager comprising a server and a database for receiving and storing the associations between the user's identity and the IP address assigned to the terminal, and between the connection ID and the assigned IP address; and a billing platform comprising a server and a database, the billing platform server receiving a billing signal from the ISP that associates the cost of the transaction with the connection ID, said billing platform server using the connection ID to retrieve from the manager database an association between the connection ID and the user's identity to bill an account in said server database associated with the user's identity for the cost of the transaction.

12. The system of claim 11 wherein the transaction involves providing the user with an interactive service.

13. The system of claim 11 wherein the transaction involves ordering and receiving an intangible good in digital format by the user's terminal from the ISP on the Internet.

14. The system of claim 13 wherein the intangible good is software.

15. The system of claim 11 further comprising at least one billing entity to which the cost of the transaction is billed to the user in accordance with a billing mechanism established by the user.

16. The system of claim 15 wherein the billing entity is determined as a function of the cost of the transaction, the type of transaction, and the identity of the ISP.

* * * * *